(12) United States Patent
Kim et al.

(10) Patent No.: US 9,650,073 B2
(45) Date of Patent: May 16, 2017

(54) FORWARD PORTION OF VEHICLE BODY

(71) Applicant: POSCO, Pohang-si (KR)

(72) Inventors: Jae-Hyun Kim, Incheon (KR);
Yeon-Sik Kang, Incheon (KR);
Hyoun-Young Lee, Incheon (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 14/410,393

(22) PCT Filed: Jun. 25, 2013

(86) PCT No.: PCT/KR2013/005610
§ 371 (c)(1),
(2) Date: Dec. 22, 2014

(87) PCT Pub. No.: WO2014/003418
PCT Pub. Date: Jan. 3, 2014

(65) Prior Publication Data
US 2015/0336614 A1    Nov. 26, 2015

(30) Foreign Application Priority Data

Jun. 26, 2012   (KR) .................. 10-2012-0068810

(51) Int. Cl.
| B62D 21/15 | (2006.01) |
| B62D 29/00 | (2006.01) |
| B62D 25/08 | (2006.01) |
| B62D 27/02 | (2006.01) |

(52) U.S. Cl.
CPC ......... *B62D 21/152* (2013.01); *B62D 25/082* (2013.01); *B62D 27/023* (2013.01); *B62D 29/008* (2013.01); *B62D 29/007* (2013.01)

(58) Field of Classification Search
CPC ........................... B62D 21/152; B62D 29/008
USPC ................. 296/187.09, 193.09, 192, 203.02
See application file for complete search history.

(56) References Cited

U.S. PATENT DOCUMENTS

| 5,031,958 | A  | * | 7/1991  | Fujita .................. | B62D 25/088 |
|           |    |   |         |                            | 180/89.1    |
| 5,484,034 | A  |   | 1/1996  | Benz et al.                |             |
| 7,090,273 | B2 | * | 8/2006  | Stojkovic ............. | B62D 25/082 |
|           |    |   |         |                            | 296/187.02  |
| 7,494,179 | B2 | * | 2/2009  | Deachin ................. | B60R 13/06  |
|           |    |   |         |                            | 156/78      |
| 7,887,122 | B2 | * | 2/2011  | Baccouche ......... | B62D 25/082 |
|           |    |   |         |                            | 296/205     |
| 2005/0077711 | A1 |   | 4/2005 | Yasui et al.               |             |
| 2008/0023953 | A1 |   | 1/2008 | Horton et al.              |             |

(Continued)

FOREIGN PATENT DOCUMENTS

| CN | 1646359 A   | 7/2005 |
| CN | 10180882    | 8/2010 |
| DE | 4008869 A1  | 9/1991 |

(Continued)

*Primary Examiner* — Jason S Morrow
*Assistant Examiner* — E Turner Hicks
(74) *Attorney, Agent, or Firm* — The Webb Law Firm

(57) ABSTRACT

A forward portion of a vehicle body includes a forward side member provided in a forward portion of a motor vehicle, and a shotgun inserted into the forward side member to be directly connected thereto. The shotgun contains an end coupling portion bent in a direction toward the forward side member so as to be coupled to the forward side member.

7 Claims, 5 Drawing Sheets

(56) References Cited

U.S. PATENT DOCUMENTS

2008/0054665 A1    3/2008   Baccouche et al.
2010/0253102 A1    10/2010   Riviere et al.

FOREIGN PATENT DOCUMENTS

| DE | 4344581 C1 | | 12/1994 |
|----|----|---|----|
| JP | 55-019457 | | 2/1980 |
| JP | 2000-318645 | | 11/2000 |
| JP | 2004-352092 | | 12/2004 |
| JP | 2007-131248 | | 5/2007 |
| JP | 2009-171032 | | 7/2009 |
| JP | 2009171032 A | * | 7/2009 |
| JP | 2010-012898 | | 1/2010 |
| KR | 10-2002-00924228 A | | 12/2002 |
| KR | 10-2012-0065464 A | | 6/2012 |

\* cited by examiner

FORWARD PORTION OF VEHICLE BODY

CROSS-REFERENCE TO RELATED APPLICATIONS

This application is the United States national phase of International Application No. PCT/KR2013/005610 filed Jun. 25, 2013, and claims priority to Korean Patent Application No. 10-2012-0068810 filed Jun. 26, 2012, the disclosures of which are hereby incorporated in their entirety by reference.

TECHNICAL FIELD

The present disclosure relates to a forward portion of a vehicle body, and more particularly, to a forward portion of a vehicle body allowing for improved collision safety by enabling a forward side member and a shotgun to be directly coupled to each other to allow for a solid connection therebetween.

BACKGROUND ART

In general, several types of safety features, such as guard rails, median strips, and the like, are installed on roads as a precaution against accidents.

In addition, besides such safety features, a variety of roadside features commonly line roads, for example, underpasses, overpasses, tunnels, bridge bypasses, and the like, and collisions between such features and motor vehicles may occur due to driver carelessness.

In the case that traffic accidents occur due to collisions between motor vehicles and the features, since a large amount of collision energy is applied to vehicles, personal injury may occur as well as damages to motor vehicles.

Therefore, in a case in which a motor vehicle crashes into general roadside features rather than safety features, or other cars, the motor vehicle is required to withstand collision energy inside the vehicle.

However, there are limitations in withstanding overall collision energy generated at the time of the collision occurrence only through the energy absorption characteristics of various materials, and in most cases, a method of compensating by allowing for an increase in a material thickness has been employed.

Such a compensation method may be directly related to an increase in a weight of a vehicle body and may be problematic in terms of improving fuel efficiency, a problem having recently emerged as an important issue.

In particular, in the case of traffic accidents, if a forward portion of a vehicle body protecting explosive components of an engine, a battery, and the like does not have an appropriate degree of collision safety, the engine or battery may explode during a collision, leading to a big accident. Therefore, improving collision safety of a forward portion of a vehicle body may be an important issue.

On the other hand, the forward portion of the vehicle body provides a forward side member and a shotgun, a rigid support member generally known as an apron panel, the forward side member and the shotgun being coupled to each other via a connection bracket. However, in such a case, when collisions occur within a range of 25% or less of a width of a car at the time of a traffic accident, the connection bracket may be easily broken due to an insufficient degree of collision absorption.

In other words, in this case, not only may sales of commercial motor vehicles be reduced due to substandard safety levels, not satisfying safety standards required in vehicle collision tests, but car passenger protection may be insufficient due to insufficient shock absorption of vehicles in the event of an actual traffic accident.

Accordingly, research into a forward portion of a vehicle body having improved collision safety through a solid combination thereof has been required.

SUMMARY OF THE INVENTION

Some embodiments in the present disclosure may provide a forward portion of a vehicle body having improved collision safety through sufficient transfer of collision energy between constituent elements and sufficient absorption of collision energy at the time of collision occurrence in the event of a traffic accident.

According to an aspect of the present disclosure, a forward portion of a vehicle body may include a forward side member provided in a forward portion of a motor vehicle, and a shotgun inserted into the forward side member to be directly connected to the forward side member.

The shotgun may include an end coupling portion bent in a direction toward the forward side member, to be coupled to the forward side member.

The forward side member may include a forward coupling hole formed to correspond to an outer circumferential surface shape of the end coupling portion.

The forward side member may further include a support portion extended inwardly of the forward side member from an edge of the forward coupling hole, to support the end coupling portion.

The forward side member may include a linear coupling hole having a shape corresponding to that of an end surface of the end coupling portion, and a connection tab connecting a plate portion provided in an inner portion of the linear coupling hole to a body of the forward side member.

The shotgun may further include a tab insertion slot having one open end and having a form elongated in a direction in which the shotgun is inserted, to correspond to a form of the connection tab.

The shotgun may include a protrusion portion protruding forwardly from the motor vehicle.

The protrusion portion may protrude such that the shotgun having the protrusion portion has a circumference 30 to 35% greater than that of a circumference of the shotgun in the case of the shotgun not having the protrusion portion.

At least one of the shotgun and the forward side member may include iron (Fe), carbon (C), silicon (Si), manganese (Mn), aluminum (Al), phosphorus (P), sulfur (S), and other impurities, as ingredients thereof, and the structure of the at least one of the shotgun and the forward side member may include at least one of ferrite, martensite, and austenite, to be provided using twinning induced plasticity steel (TWIP) having a tensile strength of 980 MPa or more and an elongation rate of 45 to 65%.

A forward portion of a vehicle body according to an exemplary embodiment in the present disclosure may facilitate collision energy transfer between a forward side member and a shotgun by ensuring the shotgun is directly connected to the forward side member.

Whereby, the forward side member and the shotgun may absorb sufficient collision energy to provide improved collision safety.

In addition, an engine, a battery, and the like may be sufficiently protected by a forward portion of a vehicle body according to an exemplary embodiment in the present disclosure, such that explosion of the engine or the battery may be prevented from leading to a big accident.

On the other hand, as the shotgun may be insertedly coupled to the forward side member, a combination thereof may be easily carried out, and since additional constituent elements are not required, productivity may be increased according to reduction in process costs.

DETAILED DESCRIPTION OF THE INVENTION AND BEST MODE

Figure 1:
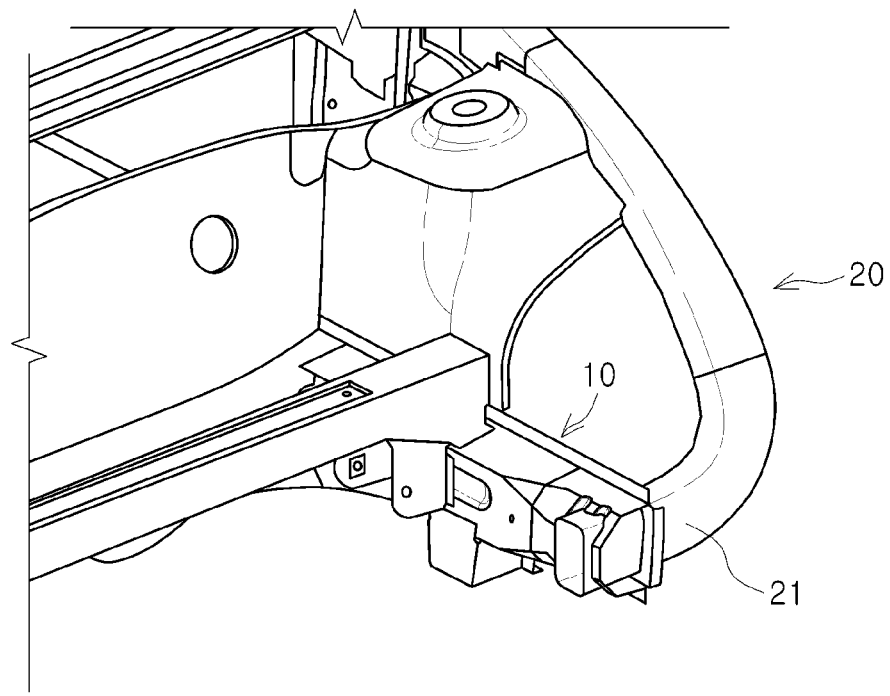
FIG. 1 is a perspective view schematically illustrating an example in which a forward portion of a vehicle body according to an exemplary embodiment in the present disclosure is installed on a motor vehicle.

Hereinafter, exemplary embodiments of the present disclosure will be described in detail with reference to the accompanying drawings. The disclosure may, however, be exemplified in many different forms and should not be construed as being limited to the specific embodiments set forth herein, and those skilled in the art and understanding the present disclosure can easily accomplish retrogressive inventions or other embodiments included in the scope of the present disclosure by the addition, modification, and removal of components within the same scope, but those are construed as being included in the scope of the present disclosure.

Further, like reference numerals will be used to designate like components having similar functions throughout the drawings within the scope of the present disclosure.

Figure 2:
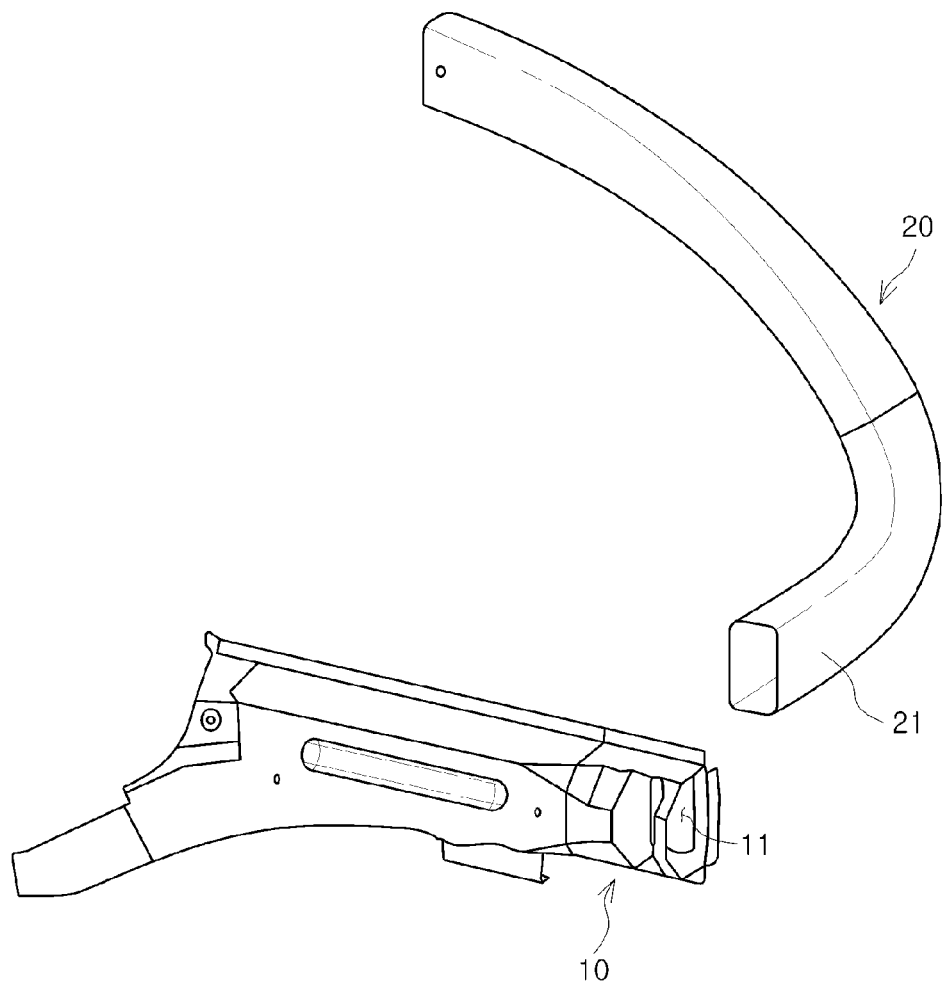
FIG. 2 is an exploded perspective view schematically illustrating a forward portion of a vehicle body according to an exemplary embodiment in the present disclosure.

FIG. 1 is a perspective view schematically illustrating an example in which a forward portion of a vehicle body according to an exemplary embodiment in the present disclosure is installed on a motor vehicle. FIG. 2 is an exploded perspective view schematically illustrating a forward portion of a vehicle body according to an exemplary embodiment in the present disclosure.

With reference to FIGS. 1 and 2, a forward portion of a vehicle body according to an exemplary embodiment in the present disclosure may include a forward side member 10 provided in a forward portion of a vehicle body of a motor vehicle, and a shotgun 20 inserted into the forward side member 10 so as to be directly connected to the forward side member 10.

In addition, the shotgun 20 of the forward portion of the vehicle body according to an exemplary embodiment in the present disclosure may include an end coupling portion 21 bent in a direction toward to the forward side member 10 so as to be coupled thereto.

In addition, the forward side member 10 of the forward portion of the vehicle body according to an exemplary embodiment in the present disclosure may include a forward coupling hole 11 formed therein to correspond to an outer circumferential surface shape of the end coupling portion 21.

The forward portion of the vehicle body according to an exemplary embodiment in the present disclosure may exhibit improved collision safety by ensuring the forward side member 10 and the shotgun 20 to be directly connected to each other to thus have a solid combination therebetween.

For example, by allowing the forward side member 10 and the shotgun 20 to be located on a collision energy transfer path, collision energy transfer between the forward side member 10 and the shotgun 20 may be easily performed to uniformly distribute collision energy to the forward side member 10 and the shotgun 20.

Thus, the forward side member 10 and the shotgun 20 may perform a sufficient degree of shock absorption transformation to absorb a relatively large amount of collision energy.

In addition, collision energy may be prevented from being transferred to different constituent elements, for example, collision energy may be prevented from being transferred to the constituent elements such as an engine, a battery, or the like of a forward portion of a motor vehicle. Whereby, the constituent element of the engine, the battery, or the like may be prevented from exploding due to collision energy transferred thereto to thus prevent a slight accident from leading to a big traffic accident.

The forward side member 10 may be a chassis-based constituent element configuring a frame of a forward body 14 of a motor vehicle and may serve to support a forward bumper and the like thereby and to absorb collision energy from a forward direction.

Although the forward side member 10 may be formed by processing a tube shaped material having a loop shaped curved surface, of which an end surface shape has a loop form, a material provided as a plurality of pieces may be used. For example, the material provided as a plurality of pieces may be processed using a press processing method or the like to then be coupled to one another to thus form the forward side member having a loop shaped curved surface, and in this case, ease in terms of processing may be obtained.

On the other hand, in order to improve strength, a bead shape may be added to the forward side member 10 through a molding process according to an exemplary embodiment in the present disclosure.

In addition, the forward side member 10 may be coupled to the shotgun 20 described below, and in this case, the shotgun 20 may be directly connected to the forward side member 10 without using a coupling member such as a connection brocket or the like according to the related art. To this end, the forward side member 10 may include a forward coupling hole 11 or a linear coupling hole 12.

The forward coupling hole 11 may have a shape corresponding to that of an outer circumferential surface of the end coupling portion 21 of the shotgun 20 described below so that the end coupling portion 21 may be inserted into the forward coupling hole 11.

For example, an outer circumferential surface of the end coupling portion 21 may have a loop shaped curved surface, and a transverse cross sectional area of the forward coupling hole 11 formed in the forward side member 10 may correspond to a transverse cross sectional area of the loop shaped curved surface of the end coupling portion 21.

As the end coupling portion 21 is insertedly coupled to the forward coupling hole 11, the forward side member 10 and the shotgun 20 may be directly connected to each other. On the other hand, to this end, the end coupling portion 21 of the shotgun 20 may be required to be bent in a direction toward to the forward side member 10, and a detailed description thereof will be described below together with a description of the shotgun 20.

In addition, the forward coupling hole 11 may include a support portion 16 supporting the end coupling portion 21 of the shotgun 20 described below. A detailed description thereof will be described below with reference to FIG. 5.

The linear coupling hole 12 may have a shape corresponding to that of an end surface of the end coupling portion 21 described below, so as to allow the end coupling portion 21 to be inserted thereinto. A detailed description thereof will be described with reference to FIG. 3.

The shotgun 20 may be coupled to the forward side member 10 provided in a forward portion of a motor vehicle, to absorb collision energy applied to the motor vehicle. For example, collision energy applied from a forward side of the motor vehicle may be absorbed by the shotgun 20 and the forward side member 10, thereby protecting components of the forward portion of the motor vehicle.

To this end, the shotgun 20 may be provided so that an end portion thereof may have a loop shaped curved surface. The shotgun 20 may be manufactured by hydroforming a tube shaped material, or roll-forming a sheet material to then be subjected to a welding process.

The shotgun 20 may be directly connected to the forward side member 10. In more detail, since the shotgun 20 and the forward side member 10 are directly connected to each other without an additional component, even in a case in which collision energy applied from a forward side of a motor vehicle is applied within a range of 25% or less of a width of the motor vehicle, for example, applied to both sides of the forward portion of the motor vehicle, sufficient collision absorption may be obtained.

For example, in a case in which the shotgun 20 and the forward side member 10 are coupled to each other via an additional component and collision energy is applied to both sides of a forward portion of a motor vehicle as in the related art, such an additional component coupling the shotgun 20 and the forward side member 10 to each other may be broken or coupled portions thereof may be easily separated so that collision energy may not be sufficiently absorbed. In this case, transfer of collisions to explosive components such as an engine, a battery, and the like, or passengers may be problematic.

However, according to an exemplary embodiment in the present disclosure, the shotgun 20 and the forward side member 10 may be directly connected to each other. Whereby, the problems occurring due to a component connecting the shotgun 20 and the forward side member 10 to each other may be removed.

On the other hand, in order to allow for the direct connection of the shotgun 20 to the forward side member 10, one end portion of the shotgun 20, for example, the end coupling portion 21, bent in a direction toward the forward side member 10 may be provided.

Thus, the end coupling portion 21 may be inserted into the forward coupling hole 11 or the linear coupling hole 12 to be described below, of the forward side member 10, so as to be directly connected thereto.

In addition, by configuring the shotgun 20 to be bent and directly connected to the forward side member 10, the shotgun 20 may have a closed end surface thereof via such a configuration, and may thus facilitate absorption of collision energy.

For example, in a manner different from that of the related art, collision energy applied from a forward side of a motor vehicle may be directly transferred to the shotgun 20 so as to be absorbed thereby, according to an exemplary embodiment in the present disclosure. Furthermore, since one surface of the shotgun 20 faces forward and may thus receive collision energy from a forward direction in a relatively large area thereof, the absorption of collision energy may be easily performed.

On the other hand, the shotgun 20 may include a tab insertion slot 22 formed therein, corresponding to a connection tab 15 of the forward side member 10, described below. A detailed description thereof will be described with reference to FIG. 3.

In addition, the shotgun 20 may include a protrusion portion 23 protruding forwardly from a motor vehicle. A detailed description thereof will be described below with reference to FIG. 4.

Figure 3:
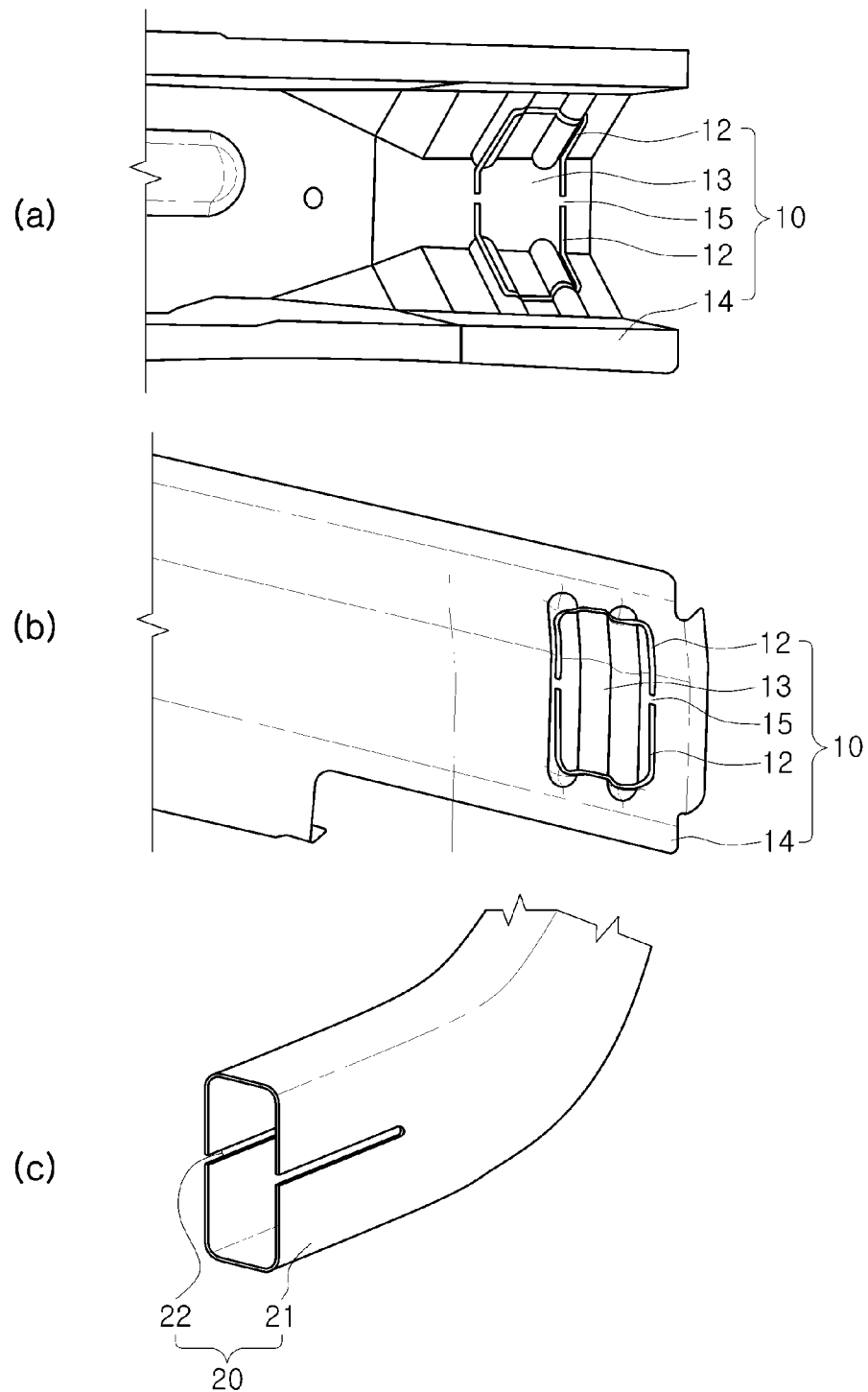
FIGS. 3A, 3B and 3C are perspective views schematically illustrating a first example of a forward portion of a vehicle body according to an exemplary embodiment in the present disclosure.

FIGS. 3A, 3B and 3C are perspective views schematically illustrating a first example of a forward portion of a vehicle body according to an exemplary embodiment in the present disclosure. FIGS. 3A and 3B are perspective views of respective pieces included in the forward side member, and FIG. 3 is a perspective view of the shotgun.

With reference to FIGS. 3A to 3C, the forward side member 10 of the forward portion of the vehicle body according to an exemplary embodiment in the present disclosure may include a linear coupling hole 12 formed to have a shape corresponding to an end surface of the end coupling portion 21, and a connection tab 15 connecting a plate portion 13 provided in an inner portion of the linear coupling hole 12 to a body 14 of the forward side member 10.

In addition, the shotgun 20 of the forward portion of the vehicle body according to an exemplary embodiment in the present disclosure may further include a tab insertion slot 22 having one open end and having a form elongated in a direction in which the shotgun is inserted, to correspond to a form of the connection tab 15.

The linear coupling hole 12 may have a form corresponding to an end surface of the end coupling portion 21 described below, such that the end coupling portion 21 may be inserted thereinto. For example, the linear coupling hole 11 may have the same role as that of the forward coupling hole 11, except for a difference that the linear coupling hole 12 is linearly formed while having a form corresponding to an end surface of the end coupling portion 21.

For example, in a case in which the linear coupling hole 12 is formed, the forward side member 10 may include the plate portion 13 and the connection tab 15. Here, the plate portion 13 may be provided in an inner portion of the linear coupling hole 12, and the connection tab 15 may serve to couple the body 14 of the forward side member 10 to the plate portion thereof.

Therefore, in order to ensure the plate portion 13 to be coupled to the forward side member 10, the linear coupling hole 12 may be provided as at least one or more linear coupling hole, based on the connection tab 15 as a boundary thereof.

As the plate portion 13 is provided inside the linear coupling hole 12, the plate portion 13 may be located in an inner portion of the end coupling portion 21 at the time of coupling thereof to the forward side member 10.

Thus, since the plate portion 13 located in the inner portion of the end coupling portion 21 may serve to support with respect to collision energy applied from a forward side of the forward side member 10 inside the end coupling portion 21, collision safety may be improved through a combination of the forward side member 10 and the shotgun 20 with each other.

The connection tab 15 may be provided as one or more connection tabs to serve to connect the plate portion 13 to the body 14 of the forward side member.

For example, although only one connection tab may connect the plate portion 13 to the body 14 of the forward side member, two or more connection tabs may allow for a further solid combination of the plate portion 13 therewith.

The tab insertion slot 22 may have a form corresponding to that of the connection tab 15 of the forward side member 10, may have one open end, and may be formed to have an elongated form extended in a direction in which the end coupling portion 21 of the shotgun 20 is inserted into the linear coupling hole 12 of the forward side member 10.

Such a configuration as described above may be applied to allow the end coupling portion 21 to be inserted into the linear coupling hole 12 without interference from the connection tab 15.

For example, the tab insertion slot 22 may have a lengthwise elongated form formed in the end coupling portion 21.

In addition, since the tab insertion slot 22 may be formed to have a form corresponding to that of the connection tab 15, a modified embodiment of the present disclosure in which a form of the tab insertion slot is changed depending on the number of the connection tabs 15 and a width thereof may be applied. As an example, in a case in which the connection tabs 15 are two, two tab insertion slots 22 may be formed in positions in which the connection tabs 15 are located.

FIGS. 4A to 4C are respectively a perspective view and cross-sectional views schematically illustrating a second example of a forward portion of a vehicle body according to an exemplary embodiment in the present disclosure. FIG. 4A is a perspective view schematically illustrating a second example of a forward portion of a vehicle body according to an exemplary embodiment in the present disclosure, and FIGS. 4B and 4C are cross sectional views of portion A-A of FIG. 4A.

Figure 4:
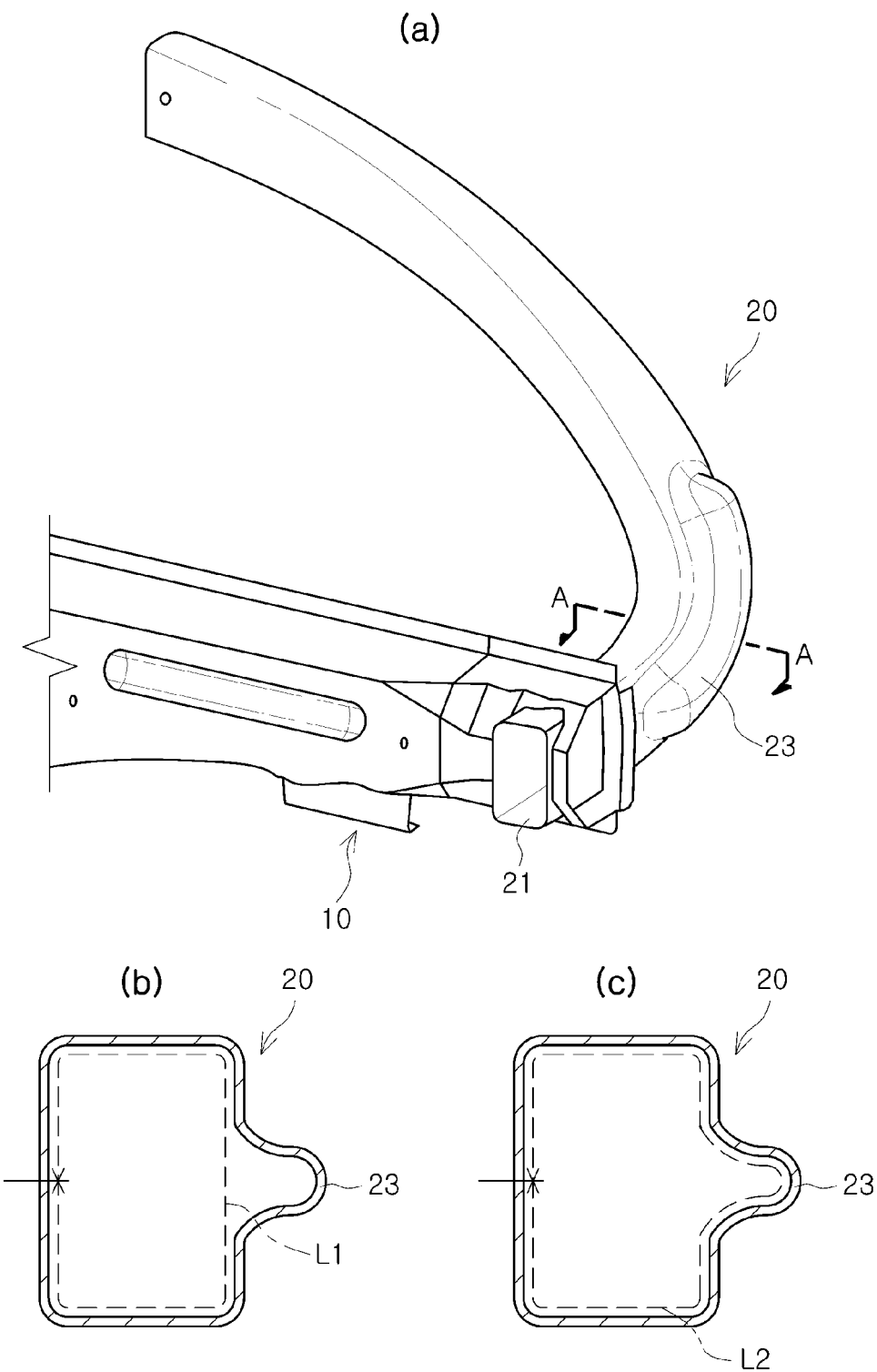
FIGS. 4A, 4B and 4C are a perspective view and cross-sectional views schematically illustrating a second example of a forward portion of a vehicle body according to an exemplary embodiment in the present disclosure.

With reference to FIG. 4, the shotgun 20 of the forward portion of a vehicle body according to an exemplary embodiment in the present disclosure may include a protrusion portion 23 protruding forwardly from a motor vehicle.

In addition, the protrusion portion 23 of the forward portion of the vehicle body according to an exemplary embodiment in the present disclosure may protrude such that the shotgun having the protrusion portion may have a circumference 30 to 35% greater than that of a circumference L1 of the shotgun, in the case of the shotgun not having a protrusion portion.

The protrusion portion 23 may be formed on the shot gun 20 to have a shape protruding forwardly from a motor vehicle, and thus, the shotgun 20 may absorb a relatively large amount of collision energy applied from a forward side of a motor vehicle.

For example, when collision energy is applied to the shotgun 20, the shotgun 20 may absorb collision energy while the shotgun is transformed, and here, through the protrusion portion 23 formed on the shotgun 20, an area of a transformed portion of the shotgun 20 to absorb the collision energy may be increased to enhance an absorption rate of collision energy.

For example, the protrusion portion 23 may have a male bead form formed in a lengthwise direction of the shotgun 20.

In addition, an inner or outer circumference L2 of the shotgun 20 having the protrusion portion 23 formed thereon may be 30 to 35% greater than an inner or outer circumference L1 of the shotgun 20 not having the protrusion portion 23 thereon.

As such, the protrusion portion 23 may be formed to prevent the occurrence of breakage in a case in which the shotgun 20 is formed using twinning induced plasticity steel (TWIP) described below.

However, exemplary embodiments of the present disclosure are not limited thereto, and as long as a shape or form of the protrusion portion may effectively absorb collision energy, any shape or form formed on the shotgun 20 may be used.

Figure 5:
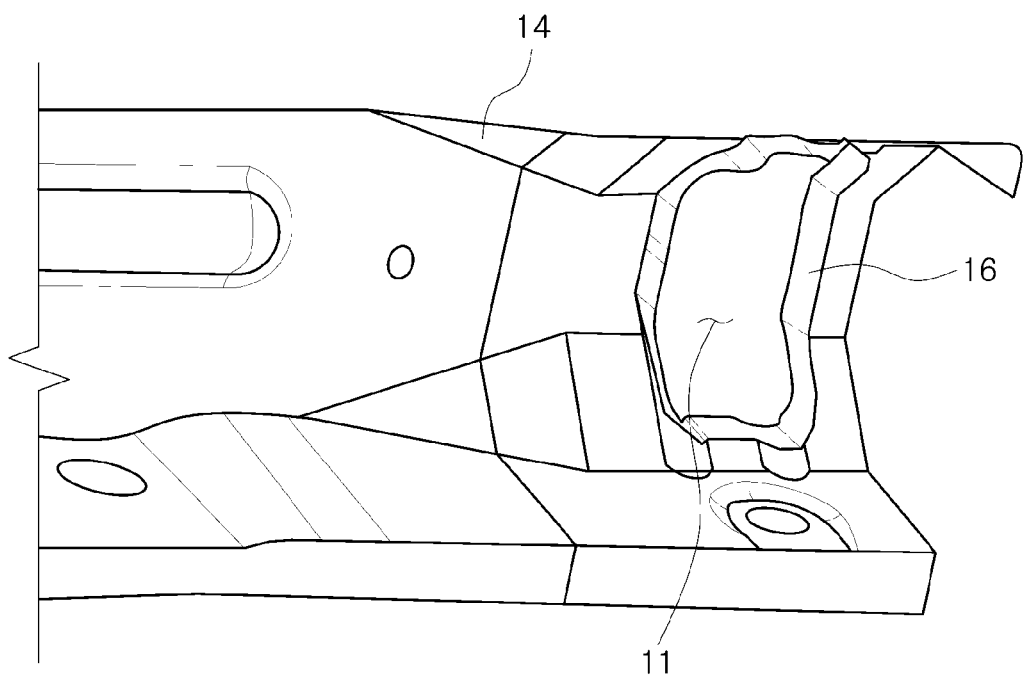
FIG. 5 is a perspective view schematically illustrating a third example of a forward portion of a vehicle body according to an exemplary embodiment in the present disclosure.

FIG. 5 is a perspective view schematically illustrating a third example of a forward portion of a vehicle body according to an exemplary embodiment in the present disclosure.

With reference to FIG. 5, the forward side member 10 of a forward portion of a vehicle body according to an exemplary embodiment in the present disclosure may further include a support portion 16 extended inwardly of the forward side member 10 from an edge of the forward coupling hole 11, to support the end coupling portion 21.

The support portion 16 may support the end coupling portion 21 when the end coupling portion 21 of the shotgun 20 is insertedly coupled to the forward coupling hole 11.

To this end, the support portion 16 may be extended inwardly of the forward side member 10 from an edge of the forward coupling hole 11.

For example, in a case in which the support portion 16 is not formed, the end coupling portion 21 is supported by a portion of the forward side member 10 corresponding to a thickness portion thereof, and in this case, structural instability may be caused therein. Therefore, according to an exemplary embodiment in the present disclosure, the support portion 16 may be formed to provide structural stability therein.

In addition, through the formation of the support portion 16, a contact area between the shotgun 20 and the forward side member 10 may be increased, and transfer of collision energy between the shotgun 20 and the forward side member 10 may be smoothly performed.

For example, the support portion 16 may facilitate the transfer of collision energy between the shotgun 20 and the forward side member 10 while stabilizing the structure supporting the end coupling portion 21.

The support portion 16 may also have a form of a passage communicating between the forward coupling hole 11 formed in one surface of the forward side member 10 to a different forward coupling hole 11 formed in the other surface thereof, in a case in which the forward side member 10 provides a closed end surface thereof.

On the other hand, the support portion 16 may also be formed to have a concave-convex surface to increase strength thereof.

In addition, at least one of the shotgun 20 and the forward side member 10 in the forward portion of the vehicle body of a motor vehicle according to an exemplary embodiment in the present disclosure may contain iron (Fe), carbon (C), silicon (Si), manganese (Mn), aluminum (Al), phosphorus (P), sulfur (S), and other impurities, as ingredients thereof, and the structure thereof may have a microstructure having at least one of ferrite, martensite, and austenite, so as to be provided using TWIP steel having a tensile strength of 980 MPa or more and an elongation rate of 45 to 65%.

For example, the TWIP steel may contain 0.3 to 0.9 weight % of carbon (C), 1.0 weight % or less of silicon (Si), 15 to 30 weight % of manganese (Mn), 0.01 to 4.0 weight % of aluminum (Al), 0.05 weight % or less of phosphorus (P), 0.01 weight % or less of sulfur (S), residual iron (Fe), and other inevitable impurities.

Thus, the exemplary embodiment of the present disclosure may be understood as an example in which a range of uses of TWIP steel from among high strength steel may be increased.

In other words, the shotgun 20 or the forward side member 10 in a forward portion of a motor vehicle according to an exemplary embodiment in the present disclosure may be manufactured using TWIP steel having good molding characteristics and relatively high strength through molding. However, in the case of only the shotgun 20 required using a material having relatively high elongation, the TWIP steel may also be used.

On the other hand, the forward portion of the vehicle body according to an exemplary embodiment in the present disclosure may also be manufactured using a different material satisfying an elongation rate or tensile strength required for molding of the shotgun 20 or the forward side member 10.

The invention claimed is:

1. A forward portion of a vehicle body, comprising:
   a metal forward side member provided in a forward portion of a motor vehicle; and
   a shotgun having a tube-shaped end coupling portion, wherein the tube-shaped end coupling portion is inserted into the forward side member directly connecting the shotgun to the forward side member and the metal of the forward side member surrounds an outer surface of the shotgun, the shotgun comprises an end coupling portion bent in a direction toward the forward side member, to be coupled to the forward side member, and the forward side member comprises:
   a linear coupling hole having a shape corresponding to that of an end surface of the end coupling portion; and
   a connection tab connecting a plate portion provided in an inner portion of the linear coupling hole to a body of the forward side member,
   wherein an opening formed between an outer perimeter of the linear coupling hole and an outer perimeter of the plate portion is discontinuous.

2. The forward portion of the vehicle body of claim 1, wherein the forward side member comprises a forward coupling hole formed to correspond to an outer circumferential surface shape of the end coupling portion.

3. The forward portion of the vehicle body of claim 2, wherein the forward side member further comprises a support portion extended inwardly of the forward side member from an edge of the forward coupling hole, to support the end coupling portion.

4. The forward portion of the vehicle body of claim 1, wherein the shotgun further comprises a tab insertion slot having one open end and having a form elongated in a direction in which the shotgun is inserted, to correspond to a form of the connection tab.

5. The forward portion of the vehicle body of claim 1, wherein the shotgun comprises a protrusion portion protruding forwardly from the motor vehicle.

6. The forward portion of the vehicle body of claim 5, wherein an area of the shotgun including the protrusion portion has a circumference 30 to 35% greater than a circumference of an area of the shotgun that does not include the protrusion portion.

7. The forward portion of the vehicle body of claim 1, wherein at least one of the shotgun and the forward side member contains iron (Fe), carbon (C), silicon (Si), manganese (Mn), aluminum (Al), phosphorus (P), sulfur (S), and other impurities, as ingredients thereof, and the structure of the at least one of the shotgun and the forward side member includes at least one of ferrite, martensite, and austenite, to be provided using twinning induced plasticity steel (TWIP) having a tensile strength of 980 MPa or more and an elongation rate of 45 to 65%.

* * * * *